Jan. 13, 1970        G. FLEISSNER        3,488,983
APPARATUS FOR THE WET TREATMENT OF MATERIALS
Original Filed Nov. 22, 1965        2 Sheets-Sheet 1

Inventor:
GEROLD FLEISSNER

Craig & Antonelli
ATTORNEYS

Jan. 13, 1970 G. FLEISSNER 3,488,983
APPARATUS FOR THE WET TREATMENT OF MATERIALS
Original Filed Nov. 22, 1965 2 Sheets-Sheet 2

(A-A)

Inventor:
GEROLD FLEISSNER
Craig & Antonelli
ATTORNEYS

# United States Patent Office 3,488,983
Patented Jan. 13, 1970

3,488,983
APPARATUS FOR THE WET TREATMENT OF MATERIALS
Gerold Fleissner, Egelsbach, near Frankfurt am Main, Germany, assignor to Anstalt fuer Patentdienst, Vaduz, Liechtenstein
Original application Nov. 22, 1965, Ser. No. 508,933, now Patent No. 3,410,119, dated Nov. 12, 1968. Divided and this application May 20, 1968, Ser. No. 730,293
Claims priority, application Germany, Nov. 21, 1964, A 47,664; Apr. 13, 1965, A 48,913
Int. Cl. D06f *21/00, 23/00, 25/00*
U.S. Cl. 68—62                                         18 Claims

ABSTRACT OF THE DISCLOSURE

An apparatus for the wet-treatment of textile materials which comprises a container means at least partially filled with a treatment liquid, at least one sieve drum means rotatably disposed within said container means, inlet means for introducing the material to be treated to the container means, baffle plate means mounted in the sieve drum means below the liquid level, said baffle plate means substantially dividing the sieve drum means into an upper and lower portion, suction means associated with the sieve drum means and disposed in the lower portion thereof for producing a suction draft causing the liquid to flow from the container into the sieve drum interior thereby forcing the material against the sieve drum means, rinsing means disposed in front of the sieve drum means, said rinsing means communicating with the suction means for conveying at least a portion of the treatment liquid from inside the sieve drum means to the rinsing means and outlet means for removing the material from the container means.

BACKGROUND OF THE INVENTION

This is a divisional application of application Ser. No. 508,933 filed Nov. 22, 1965, now Patent No. 3,410,119.

The present invention relates to an apparatus for the wet-treatment of materials, especially for scouring and impregnating fibrous or grainy materials, particularly loose, fibrous material. The apparatus according to the present invention is equipped with at least one sieve drum subjected to a suction draft in which a liquid flow from the outside to the inside of the sieve drum is created by the suction draft which forces the fibrous material against the sieve drum and rinses the material. A baffle plate within the sieve drum interrupts the suction draft over at least one portion of the sieve drum.

For the wet treatment, especially for the scouring of raw wool and similar materials, a number of devices are known. In one of the known devices, the raw wool or similar fibrous materials are carried through the treatment liquid between two conveyor belts.

In another similar device, the treatment liquid is simultaneously passed through the material to be treated by means of jets. This requires a relatively large amount of energy, since the two conveyor belts and the material held in a compressed condition on and/or in between the two belts offer a considerable resistance. Furthermore, it is difficult in such prior art installations to effectively dissolve the dirt particles and to remove the same.

Furthermore, devices with sieve drums subjected to a suction draft are known in which the suction draft is interrupted at one portion of the sieve drum by means of a baffle plate. In the known device, the baffle consists of semi-cylindrical carriers on which the cylinder glides. If the baffle is formed of cylindrical carriers, it is necessary to slidably fit the cylinder on the cylinder carrier which, in turn, requires an extremely accurate manufacture of the sieve cylinder and the cylinder carrier. Accurate manufacture makes the device more expensive and, due to the friction between cylinder and cylinder carrier, both parts are subjected to more wear and tear. The particles ground off during relative movements of the cylinder and cylinder carrier contaminate the treatment bath and are deposited on the fibrous material which acts as a filter.

In order to avoid these disadvantages, it has been suggested to form the baffle in the sieve drums of essentially straight sheets which divide the sieve drum into at least two spaces in a device with sieve drums which are preferably immersed only partially into the liquid. One of these two spaces is subjected to a suction draft, while the other one is not subjected to a suction draft. In order to obtain a good treatment effect and good guidance of the material in the liquid, it is advantageous to mount the baffle immediately below the liquid level in the sieve drum.

A baffle in a drum which is partially immersed in the treatment liquid offers the advantage that essentially more powerful suction drafts can be applied than in a device without baffle plates since the liquid level in the sieve drum cannot sink as compared with the liquid level outside the sieve drum. Thus, foaming of the treatment liquid due to too large a difference between the liquid level outside the sieve drum and the liquid level inside the sieve drum is avoided. However, more important, due to the baffle plate, the material is more readily detached from the drum at the point of passage from one conveying means to the next one.

However, tests have shown that mounting a baffle plate immediately below the liquid level also presents some problems. It has been found that if the liquid level sinks below the baffle, an air-liquid mixture is drawn off which causes considerable foaming of the liquid. However, foaming of the liquid is most undesirable because on the one hand, the foam emerging from the bath will soil the material in the vicinity of the wet-treatment device, while on the other hand, the liquid loss is considerable.

SUMMARY OF THE INVENTION

An object of the present invention is to avoid the prior art disadvantages in the wet-treatment of materials, for example, textile materials.

In accordance with the present invention, this object is achieved by using a sieve drum apparatus containing baffle means comprising substantially straight sheets which are advantageously mounted slightly below the liquid level and wherein the suction openings of an exhaust connection are disposed considerably below the liquid level. By using this combination in the sieve drum of baffle plates and suction openings disposed considerably below the liquid level, the advantages of baffle plates immediately below the liquid level are maintained whereas the aforementioned disadvantages are eliminated because now, even if the liquid falls below the baffle plates, only liquid and not a liquid-air mixture is drawn off.

In one embodiment of the present invention, the exhaust connections are fastened to the baffle plate. It is advantageous if the exhaust connections are extended conically in the direction of the suction opening.

In another embodiment of the present invention, it is suggested to arrange a channel on the baffle plate preferably above the baffle plate for the lateral removal of the liquid drawn into the sieve drum. In accordance with another object of the present invention, the wall of the channel is provided with openings at the point of material passage on the sieve drum, said openings being adjustable to the open or closed position. The liquid which emerges through the openings facilitates detachment of the material from the sieve drum, and at the same time removes all fibers and/or material residues from the sieve drum.

According to another object of the present invention, the pumps for drawing off the liquid in the sieve drum are arranged at and/or mounted on the baffle means.

Instead of arranging the exhaust connections at the baffle plate, it is also possible to arrange the same on one or both faces of the sieve drum. In another embodiment of the present invention, it suggested to use a perforated tube as an exhaust connection which extends preferably over the whole length of the sieve drum. By means of this perforated tube, a uniform suction draft over the whole length of the sieve drum is ensured.

Another signifiscant feature and characteristic of the present invention resides in connecting the exhaust connections of all or at least of a group of sieve drums with a common suction chamber arranged preferably at the sides of the sieve drum so that only one suction device is required for all and/or for at least one group of sieve drums. This not only makes the wet treatment device with several sieve drums cheaper, but it also improves the economy since, in general, the efficiency of one larger, high-capacity suction pump is better than that of a number of smaller suction pumps.

Another object of the present invention is to return the liquid drawn off into the liquid bath to the inlet side of the apparatus. i.e., at the beginning of the bath in such a way that a slight flow in the direction of material passage is created in the bath. This makes it also possible in a device for the treatment of loose, fibrous material to arrange the sieve drums at a predetermined distance from each other so that a floating distance for the fibrous material is provided between the individual sieve drums. This permits the dissolved dirt particles which are being detached from the fibers to sink down and enables the loose, fibrous material to form a fleece of uniform thickness.

The scouring effect is substantially improved by providing individual floating zones between the sieve drums. It has been found that such floating zones almost doubles the scouring effect per sieve drum utilized. Thus fewer sieve drums can produce the same scouring effect and/or wetting effect in a device with sieve drums subjected to a suction draft when floating distances are arranged between the sieve drums. This feature also renders the device more economical.

Another improvement in the treatment effect can be achieved if, according to the present invention, at least one rinsing device is arranged at the material inlet, said rinsing device being provided with at least part of the treatment liquid drawn out of the sieve drum or sieve drums. The rinsing device may be arranged above a conveyor belt which carries the material or above a floating zone of the treatment bath. The rinsing device prewets the material and thus dissolves the dirt particles so that there is produced a good cleaning effect on the first sieve drum. Instead of a conveyor belt, a floating zone of a prescribed distance for the fibrous material to be treated may be provided, above which zone the rinsing device is disposed.

The rinsing device may be equipped with a closed or open rinsing box. In order to make the apparatus independent of the quantity of treatment liquid fed to the rinsing boxes, said boxes are provided with an overflow line through which the excess liquid is returned to the bath preferably at the inlet so that a flow in the direction of material passage is created in the bath or that this flow is favored and promoted. In the case of closed rinsing boxes, an excess pressure valve may be provided in the overflow line.

According to another object of the present invention, the contact surface of the conveyor belt should lie immediately below the liquid level, preferably by the thickness of the material layer. This arrangement of the conveyor belt ensures that the material to be cleaned is covered by the liquid and transported through the bath without too many relative motions of the fibers which would result in felting.

In another embodiment of the present invention it is suggested to subject the contact surface of the conveyor belt to a suction draft, e.g., by means of a pumping device which draws the treatment liquid from below the contact surface of the conveyor belt and returns it into the bath above the contact surface, for example, by way of rinsing boxes. An unfavorable effect, e.g., felting caused by liquid dripping down on the material, does not occur in this case because the material is covered by the liquid.

A sieve drum containing a suction device as a conveying means and preferably a pair of rollers for squeezing the liquid out of the fibers are arranged behind the conveyor belt.

According to another embodiment of the present invention, it is suggested to divide the bath container into a suction chamber below the conveyor belt and a suction chamber below the sieve drum, to connect the two suction chambers, and to return the treatment liquid drawn off the sieve drums at least partially into the bath above the conveyor belt. In such a construction and design it is ensured that the treatment liquid is permanently drawn through the fiber fleece floating in the treatment liquid on the conveyor belt in a direction from above to below said belt, and that, in this manner, the fiber fleece is readily held on the conveyor belt. This results in a safe transportation of the material and also prevents felting of the material. At the same time the loose dirt particles are floated downwards and are allowed to settle, e.g., on the bottom of the container.

In order to separate contaminations from the treatment liquid and in accordance with another embodiment of the present invention, it is suggested to arrange a perforated bottom below the conveyor belt. If the perforated bottom is not provided, the settling boxes arranged below the conveyor belt are provided with an open bottom which terminates in another settling container and communicates with at least that portion of the bath which lies below the sieve drum.

In order to avoid individual fibers or part of the fibers from being drained off the sides of the conveyor belt and deposited in the bearings or on the bottom of the container, it is suggested to seal the conveyor belt laterally by guiding boxes which are provided with openings directed towards the material, through which openings liquid emerges. By using this liquid the material at the margins of the fiber fleece is always floated slightly towards the middle. Thus the material cannot drop off the conveyor belt or be drained off the conveyor belt. The boxes for sealing the conveyor belt may be connected with the suction device of the sieve drum and part of the liquid drawn off may be returned through the boxes into the bath. However, the boxes may also be connected with the settling container and may be fed by the settling container which is more advantageous if the device is adequately designed.

It is also expedient to arrange suction boxes below the contact surface of the perforated belt said boxes being connected with a suction or pumping device. However, these suction boxes should not extend over the entire area of the conveyor belt but should be arranged at a predetermined distance from each other so that there is alternately provided a zone subjected to a suction draft and a zone not subjected to a suction draft. It has been found that with such an arrangement of the suction boxes according to the present invention, the cleaning effect is substantially better than with a common suction box extending over the entire contact surface and arranged below the contact surface and/or below the conveyor belt.

BRIEF DESCRIPTION OF THE DRAWINGS

The present invention will become more fully understood from the detailed description given hereinbelow and the accompanying drawings which are given by way of illustration only and thus are not limitative of the present invention and wherein.

DESCRIPTION OF THE PREFERRED EMBODIMENTS

Figure 1:
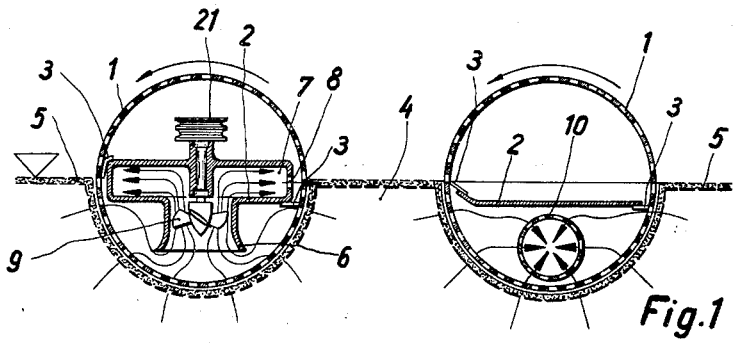
FIGURE 1 is a cross-sectional view through two sieve drums according to the present invention and provided with different suction devices. The sieve drums are partially immersed in a treatment liquid.

Referring now to the drawings wherein like reference numerals are used throughout the various views to designate like parts, reference numeral 1 designates in all figures sieve drums which are partially immersed in a treatment liquid 4. Immediately below the liquid level in the sieve drums 1 to a baffle 2 which generally comprises straight sheets with lateral elastic sealing strips 3 is provided. In the case of the front sieve drum according to FIGURE 1 and the sieve drums according to FIGURE 2 a channel 7 is provided above the baffle plate 2. The liquid drawn in through exhaust connection 6 by means of pump 9 is discharged through the channel. As a result of the suction draft, loose material 5 is held to the drum jacket conveyed through the liquid and at the same time said material is intensely penetrated by the treatment liquid. In that wall of channel 7 openings 8 are provided approximately at the height of the liquid level. Through these openings part of the liquid drawn in by the suction draft flows out and is directed towards the material. In this way, detachment of the loose material 5 from the sieve drum is readily facilitated.

Another possible use of the suction device and the baffle plate is shown in the right-hand sieve drum in FIGURE 1. Here a baffle plate 2 consists essentially of a flat sheet, the edges of which are again provided with elastic sealing strips 3. However, here the sealing strips are arranged in such a way that, at the inlet and the discharge end, they interrupt the suction draft at different levels. The suction draft at the inlet of the drum reaches approximately the liquid level whereas the suction draft at the delivery end of the drum is interrupted at a certain distance below the liquid level. Thus, detachment of the material 5 from the sieve drum is facilitated. In this design, the exhaust connection is a perforated tube 10 which is arranged in the lower part of the sieve drum. The tube 10 is arranged in such a way that even in the case of larger variations of the liquid level, it lies always below the liquid level.

Figure 2:
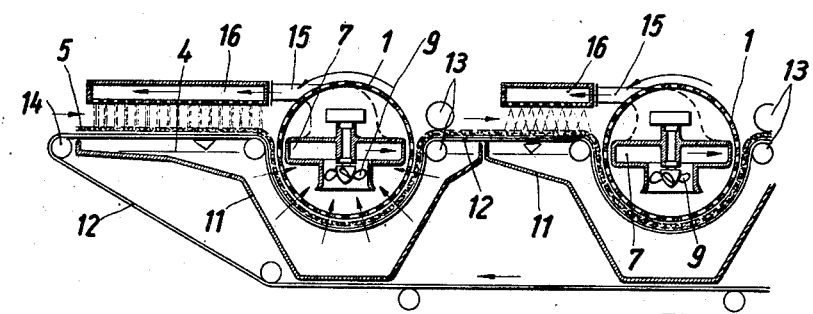
FIGURE 2 is a cross-sectional view through the initial zone of a scouring device according to the present invention.

In the device according to FIGURE 2, an endless conveyer belt 12 serves for transporting the material 5 which conveyor belt 12 extends over several liquid containers 11. For holding and guiding the endless conveyor belt 12, rollers 14 and the lower rollers of the pairs of squeeze rollers 13 are provided. In the device according to FIGURE 2, the liquid drawn out of sieve drums 1 is fed into rinsing boxes 16 by way of line 15. At the inlet of each treatment zone the material 5 is first wet-treated by rinsing and then it is treated in a treatment liquid 4. After each treatment zone a pair of squeeze rollers 13 are provided which squeeze excess treatment liquid out of the material. Pump 9 is formed like a fan wheel and can be driven directly by a motor in the sieve drum. In general because of better accessibility, it is advantageous to connect the pump by means of V-belt discs 21 and V-belts (not shown) to a drive (not shown) arranged laterally outside the sieve drum 1.

Figure 3:
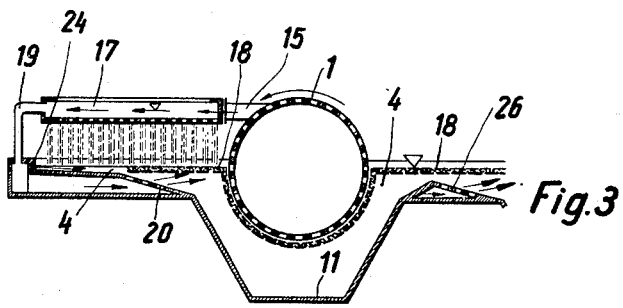
FIGURE 3 is a cross-sectional view through the initial zone of another scouring device in accordance with the present invention.

Instead of closed rinsing boxes 16 as shown in FIGURE 2, also open rinsing boxes 17 as shown in FIGURE 3 can be used. In the construction according to FIGURE 3 instead of a conveyor belt, a floating zone 18 is provided in front of each sieve drum 1 above which floating zone one or several open rinsing boxes 17 are arranged. The rinsing box 17 is provided with an overflow line 19 through which the excess of the liquid fed by pump 9 is discharged and returned into the bath through a perforated bottom part 20 and/or through openings 24 at the bath inlet. This creates a flow in the direction of material passage in the bath, which flow floats the material to a sieve drum 1 and over another floating distance 18 to the next sieve drum which is not shown in FIGURE 3. Part of the liquid drawn off and discharged from a subsequent sieve drum can again emerge through a perforated bottom element 26. Above this floating distance a rinsing box may also be arranged.

Figure 4:
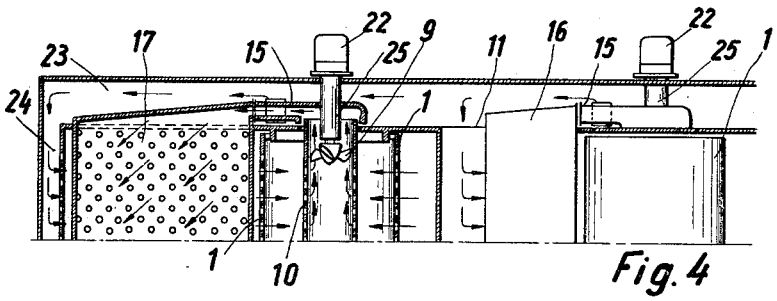
FIGURE 4 is a partial plan view of a scouring device according to the present invention with component parts partially shown in sections.

Instead of passing through rinsing boxes or being returned adjacent to the rinsing boxes, the liquid drawn off may be returned to the bath at the inlet through a lateral channel 23. As shown in FIGURE 4, also part of the liquid drawn out of the sieve drums 1 can be returned to the liquid bath at the bath inlet directly, whereas another part of the liquid is returned into rinsing boxes 16 and 17. The amount returned into the rinsing boxes may be varied by means of, e.g., a flap or similar device. In the device according to FIGURE 4, perforated tubes 10 are provided in the sieve drums for drawing off the liquid, in which tubes a pump 9 is disposed, which is directly connected by a shaft 25 to a drive 22 outside the device.

Figure 5:
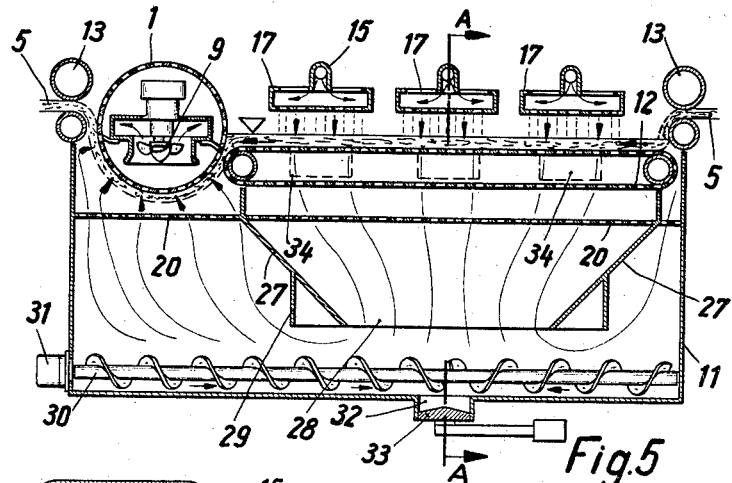
FIGURE 5 is a longitudinal cross-sectional view through another device of the present invention.
Figure 6:
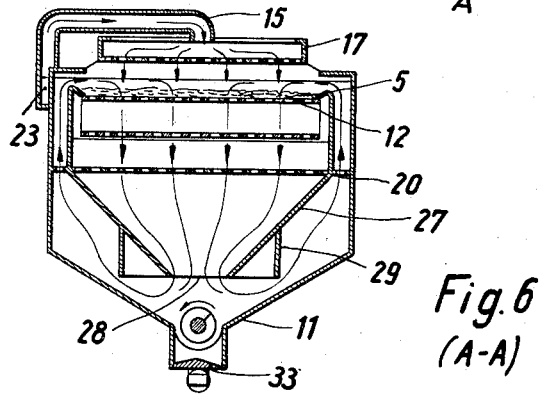
FIGURE 6 is a cross-sectional view, taken along line A—A of the device according to FIGURE 5.
Figure 7:
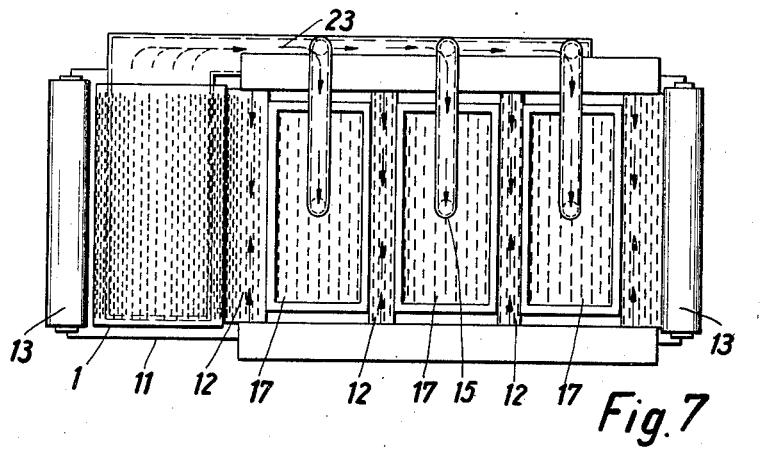
FIGURE 7 is a plan view on the device according to FIGURES 5 and 6.

The device shown in FIGURES 5 to 7 consists essentially of a relatively deep liquid container 11 which serves as a settling container. In the settling container 11, a sieve bottom 20 is arranged which divides the container into an upper treatment space and a lower settling space.

Above the sieve bottom 20 a conveyor belt 12 is arranged in the liquid, the contact surface of which lies below the liquid level by preferably the material thickness, i.e., by the thickness of loose material 5 floating onto the conveyor belt 12. A pair of rollers 13 are arranged at the inlet of the device and at the discharge end of the device a sieve drum 1 subjected to a suction draft with a pair of rollers 13 is disposed. In the device shown, pumps 9 are arranged in the sieve drum 1. The pumps draw the liquid through the fibrous material and into rinsing boxes 17 which are arranged just above the liquid level. For this purpose a channel 23 arranged at the side of the device and/or at the bath is provided, which channel lies preferably below the liquid level so that it is always filled with liquid, even if the device is stopped. Thus it need not be filled with liquid again if the device is started anew.

Below the perforated bottom 20 and the conveyor belt 12 a settling box 27 is provided, the lower end of which is conically constricted and provided with an opening 28 through which the dirt may settle into the lower part of the device which serves as a settling container. In order to slow down the speed of the liquid flow in the lower part of the device serving as a settling container, walls 29 extending vertically downwards are arranged at the settling box 27. For removing the deposited contaminations, a worm conveyor 30 with a drive 31 is arranged at the bottom of container 11 and an opening 32 with a suitable cover 33 is provided.

Below the contact surface of the conveyor belt 12, suction boxes 34 are shown by the dashed line.

It has been found that if, according to the present invention, a liquid flow in the direction of the fall of the dirt particles is provided, the cleaning effect is substantially improved. This permits better settling of the contaminants. At the points where the contaminations are separated from the material, no detrimental countercurrents occur which would impede settling of these particles.

While I have shown and described several embodiments of the present invention, it should be understood that the same is not limited thereto but is susceptible of numerous changes and modifications as known to a person skilled in the art.

It is claimed:

1. An apparatus for the wet-treatment of textile materials which comprises a container means at least partially filled with a treatment liquid, at least one sieve drum means rotatably disposed within said container means, inlet means for introducing the material to be treated to the container means, baffle plate means mounted in the sieve drum means below the liquid level, said baffle plate means substantially dividing the sieve drum means into an upper and lower portion, suction means associated with the sieve drum means and disposed in the lower portion thereof for producsing a suction draft causing the liquid to flow from the container into the sieve drum interior thereby forcing the material against the sieve drum means, rinsing means disposed in front of the sieve drum means, said rinsing means communicating with the suction means for conveying at least a portion of the treatment liquid from inside the sieve drum means to the rinsing means and outlet means for removing the material from the container means.

2. The apparatus of claim 1, wherein the suction means comprises a perforated tube subjected to a suction draft which is disposed below the baffle plate means in the lower portion of the sieve drum means.

3. The apparatus of claim 2, wherein a pump means is axially disposed in the perforated tube at one of its end portions.

4. The apparatus of claim 1, wherein lateral channel means communicate with the suction means for conveying at least a portion of the treatment liquid from inside the sieve drum means to the container means in front of the sieve drum means.

5. The apparatus of claim 1, wherein overflow means are associated with the rinsing means for returning excess liquid supplied to said rinsing means to the container means in front of the sieve drum means.

6. The apparatus of claim 1, wherein the baffle plate means comprises straight sheets provided with elastic sealing strips at the periphery thereof.

7. The apparatus of claim 6, wherein the sealing strips seal the baffle plates to the inside of the sieve drum means at about the liquid level on the intake side of the sieve drum means and below the liquid level on the discharge side of the sieve drum means.

8. The apparatus of claim 4, wherein more than one sieve drum means is utilized and a floating zone is provided in front of each sieve drum means.

9. The apparatus of claim 8, wherein the rinsing means is disposed above the floating zone.

10. The apparatus of claim 5, wherein more than one sieve drum means is utilized and a floating zone is provided in front of each sieve drum means.

11. The apparatus of claim 10 wherein the rinsing means is disposed above the floating zone.

12. The apparatus of claim 1, wherein more than one sieve drum means is utilized and endless conveyor belt means are provided for conveying the material through at least a portion of the container means.

13. The apparatus of claim 12, wherein the conveyor belt means is disposed below the liquid level to the extent of the thickness of the material layer being treated.

14. The apparatus of claim 1, wherein the suction means comprises the baffle plate means provided with an exhaust connection which has a suction opening disposed below the liquid level, said baffle plate means also defining channel means communicating with said exhaust connection and extending laterally to the vicinity of the wall of the sieve drum interior for the lateral discharge of at least a portion of the treatment liquid, said exhaust connection also communicating with the rinsing means.

15. The apparatus of claim 14, wherein pump means is disposed in the exhaust connection.

16. The apparatus of claim 14, wherein the channel means are provided with openings in the vicinity of the wall of the sieve drum interior at about the height of the liquid level, said openings being adjustable to the open or closed position.

17. The apparatus of claim 2, wherein the perforated tube extends over the entire length of the sieve drum means.

18. The apparatus of claim 1, comprising more than one sieve drum means wherein the suction means of each sieve drum is provided with one common suction chamber arranged on the side of the sieve drum means.

References Cited

UNITED STATES PATENTS

| | | | |
|---|---|---|---|
| 899,440 | 9/1908 | Shuman | 68—44 X |
| 2,293,154 | 8/1942 | Lovett | 68—22 X |
| 3,011,328 | 12/1961 | Fleissher | 68—158 |

FOREIGN PATENTS 460,369  10/1949  Canada.

WILLIAM I. PRICE, Primary Examiner